(12) United States Patent
Zhang

(10) Patent No.: US 11,317,080 B2
(45) Date of Patent: Apr. 26, 2022

(54) IMAGE PROCESSING METHOD AND DEVICE, AND THREE-DIMENSIONAL IMAGING SYSTEM

(71) Applicant: Scivita Medical Technology Co., Ltd., Jiangsu (CN)

(72) Inventor: Yi Zhang, Jiangsu (CN)

(73) Assignee: Scivita Medical Technology Co., Ltd., Jiangsu (CN)

(*) Notice: Subject to any disclaimer, the term of this patent is extended or adjusted under 35 U.S.C. 154(b) by 0 days.

(21) Appl. No.: 17/057,383

(22) PCT Filed: May 6, 2019

(86) PCT No.: PCT/CN2019/085687
§ 371 (c)(1),
(2) Date: Nov. 20, 2020

(87) PCT Pub. No.: WO2019/223523
PCT Pub. Date: Nov. 28, 2019

(65) Prior Publication Data
US 2021/0203912 A1 Jul. 1, 2021

(30) Foreign Application Priority Data

May 23, 2018 (CN) .......................... 201810500309.5

(51) Int. Cl.
*G06T 15/00* (2011.01)
*H04N 13/275* (2018.01)
(Continued)

(52) U.S. Cl.
CPC ......... *H04N 13/275* (2018.05); *G06T 15/205* (2013.01); *H04N 13/261* (2018.05); *H04N 13/344* (2018.05); *H04N 2013/0088* (2013.01)

(58) Field of Classification Search
None
See application file for complete search history.

(56) References Cited

U.S. PATENT DOCUMENTS

| 8,787,695 B2* | 7/2014 | Wu ..................... G06K 9/00442 |
| | | 382/266 |
| 2003/0011610 A1* | 1/2003 | Kitsutaka ................ G06T 15/40 |
| | | 345/582 |

(Continued)

FOREIGN PATENT DOCUMENTS

| CN | 103329547 A | 9/2013 |
| CN | 105096245 A | 11/2015 |

(Continued)

OTHER PUBLICATIONS

Balcerek et al., Stereovision Option for Monitoring Systems—A Method Based on Perception Control of Depth, 2013, IEEE Signal Processing: Algorithms, Architectures, Arrangements, and Applications, pp. 226-230 (Year: 2013).*

*Primary Examiner* — Anh-Tuan V Nguyen
(74) *Attorney, Agent, or Firm* — Bret E. Field; Bozicevic, Field & Francis LLP

(57) ABSTRACT

Disclosed are an image processing method and device, and a three-dimensional imaging system. The method comprises the following steps of: acquiring a two-dimensional image to be processed; aligning the two-dimensional image to be processed to a grid template; performing mapping processing on the two-dimensional image to be processed by using a grid mapping table to acquire a first image, wherein the grid mapping table is used for representing the mapping relationship of grid images; mirroring the first image to acquire a second image; and synthesizing the first image and the second image to acquire the superimposed image of the first image and the second image. According to the method, the grid template and the grid mapping table are used for performing mapping processing on the two-dimensional image to be processed so as to simulate a left-eye image and a right-eye image acquired by human eyes; and a same two-dimensional image to be processed need to be mapped only once to acquire the left-eye image and the right-eye image, the steps of image processing being reduced, thus the time of image processing being shortened, and providing favorable conditions for the follow-up real-time conversion of the superimposed two-dimensional image into a three-dimensional image.

7 Claims, 5 Drawing Sheets

(51) Int. Cl.
*H04N 13/344* (2018.01)
*H04N 13/261* (2018.01)
*G06T 15/20* (2011.01)
*H04N 13/00* (2018.01)

(56) References Cited

U.S. PATENT DOCUMENTS

| | | | | |
|---|---|---|---|---|
| 2005/0093697 | A1* | 5/2005 | Nichani | G06T 7/593 340/545.1 |
| 2009/0060300 | A1* | 3/2009 | Neemuchwala | G06K 9/6203 382/128 |
| 2012/0218259 | A1* | 8/2012 | Takahashi | H04N 13/356 345/419 |
| 2013/0222541 | A1* | 8/2013 | Suh | H04N 21/4345 348/43 |
| 2018/0253820 | A1* | 9/2018 | Knott | G06T 3/60 |
| 2018/0332222 | A1* | 11/2018 | Yao | G06T 7/593 |

FOREIGN PATENT DOCUMENTS

| | | |
|---|---|---|
| CN | 105608666 A | 5/2016 |
| CN | 106663339 A | 5/2017 |
| CN | 108737810 A | 11/2018 |
| JP | 2011-186930 A | 9/2011 |

\* cited by examiner

| 0000 | 0001 | 0010 | 0011 |
| --- | --- | --- | --- |
| 0100 | 0101 | 0110 | 0111 |
| 1000 | 1001 | 1010 | 1011 |
| 1100 | 1101 | 1110 | 1111 |

IMAGE PROCESSING METHOD AND DEVICE, AND THREE-DIMENSIONAL IMAGING SYSTEM

FIELD OF THE PRESENT DISCLOSURE

The present disclosure relates to a technical field of image processing, in particular to an image processing method and device, and a three-dimensional imaging system.

BACKGROUND OF THE PRESENT DISCLOSURE

Stereoscopic vision means when an object is viewed through both eyes by human, a sense, of the thickness of the viewed objects and the depth or distance of space and the like, may arise subjectively. The main reason is that the images of the same viewed object on the retinas of both eyes are not exactly identical, where the left eye sees more left side of the object from the left while the right eye sees more right side of the object from the right; and a stereoscopic image of the object is generated after the image information from both eyes is processed through a senior visual center.

With the development of display technology and digital technology, it has become a research hotspot to imitate the stereoscopic vision of human eyes by the use of electronic products. In the prior art, users may view a 3D image only if a 3D camera device is adopted. Most of the existing 3D camera devices operate by imitating the structure of human eyes, each of which comprises two cameras, wherein an image acquired by one of the cameras corresponds to a left-eye image for human eyes, and an image acquired by the other of the cameras corresponds to a right-eye image for human eyes; and then, the left-eye image and the right-eye image may be synthesized by image processing means to form the 3D image.

Thereinto, for a three-dimensional imaging system in the prior art, the left-eye image and the right-eye image are acquired by two cameras, respectively; and the two images are processed separately for subsequent three-dimensional imaging. However, the image processing method has relatively large time delay from the acquisition of the image to the completion of the processing, and is not suitable for some occasions that require a relatively high real-time performance.

SUMMARY OF THE PRESENT DISCLOSURE

In view of this, the embodiment of the present disclosure provides an image processing method and device, and a three-dimensional imaging system so as to solve the problem of relatively large time delay in image processing.

According to one first aspect, the embodiment of the present disclosure provides an image processing method, which comprises the following steps of:
acquiring a two-dimensional image to be processed;
aligning the two-dimensional image to be processed onto a grid template, wherein the grid template is used for performing grid division on the two-dimensional image to be processed;
performing mapping processing on the two-dimensional image to be processed by using a grid mapping table to acquire a first image, wherein the grid mapping table is used for representing a mapping relationship of grid images;
mirroring the first image to acquire a second image, wherein the first image is a left-eye image, and the second image is a right-eye image; or the first image is a right-eye image, and the second image is a left-eye image; and
synthesizing the first image and the second image to acquire a superimposed image of the first image and the second image.

According to the embodiment of the present disclosure, the grid template and the grid mapping table are used for performing mapping processing on the two-dimensional image to be processed so as to simulate the left-eye image and the right-eye image acquired by the human eyes; that is, according to the method, the mapping processing need be performed on the same two-dimensional image to be processed only once, the left-eye image and the right-eye image may be acquired, and accordingly the steps of image processing are reduced, thus, the time of image processing is shortened, and conditions are provided for the follow-up real-time conversion of the superimposed two-dimensional image into a three-dimensional image. With reference to the first aspect, in the first implementation manner of the first aspect, the grid mapping table comprises the number of each of grids in the grid template; and the information of the mapped grid images is stored in the grid mapping table corresponding to the numbers.

According to the embodiment of the present disclosure, each of the grids in the grid template is numbered; the numbers are corresponding to the information of the mapped grid images one to one so as to avoid confusion of the mapped grid image information occurring when the plurality of grid images are processed in parallel, and to improve the accuracy of follow-up mapping processing.

With reference to the first implementation manner of the first aspect, in the second implementation manner of the first aspect, the performing mapping processing on the two-dimensional image to be processed by using a grid mapping table to acquire the first image comprises following steps of:
dividing the two-dimensional image to be processed through the grid template to form the plurality of grid images to be processed;
acquiring the numbers of the grid images to be processed;
searching the grid mapping table, and extracting the information of the grid images corresponding to the numbers;
processing the grid images to be processed by using the extracted information of the grid images; and
combining the processed grid images to be processed to acquire the first image.

According to the embodiment of the present disclosure, the corresponding grid image information is extracted from the grid mapping table by using the numbers corresponding to each divided grid image to be processed to process the grid images to be processed. Thereinto, as each two-dimensional image to be processed is distinguished by the number, the simultaneous processing of the plurality of grid images to be processed may be realized, and the efficiency of image processing is improved.

With reference to the second implementation manner of the first aspect, in the third implementation manner of the first aspect, the information of the grid images refers to the sizes of the grid images;
the processing the grid images to be processed by using the extracted information of the grid images comprises the step of:
scaling the grid images to be processed according to the extracted sizes of the grid images.

According to the embodiment of the present disclosure, scaling processing is performed on each grid image to be processed by using the sizes of the mapped grid images stored in the grid mapping table, that is, the grid images to be processed are processed from the perspective of the image sizes without involving the resolution and pixels of the images and other information; and thus the image quality may be ensured on the one hand; and the processing efficiency may be improved on the other hand.

With reference to the first aspect, in the fourth implementation manner of the first aspect, the synthesizing the first image and the second image to acquire the superimposed image of the first image and the second image comprises the following steps of:

aligning one side edge of the first image to one side edge of the second image, wherein the central point of the side edge of the first image coincides with the central point of the side edge of the second image;

translating the first image or the second image along the center lines of the side edges to acquire the superimposed image.

With reference to the first aspect, in the fifth implementation manner of the first aspect, the two-dimensional image to be processed is one frame image in video streaming.

According to the second aspect, the embodiment of the invention provides an image processing device which comprises:

an acquisition module for acquiring a two-dimensional image to be processed;

an alignment module for aligning the two-dimensional image onto be processed onto the grid template, wherein the grid template is used for performing grid division on the two-dimensional image to be processed;

a mapping module for performing mapping processing on the two-dimensional image to be processed by using the grid mapping table to acquire the first image, wherein the grid mapping table is used for representing the mapping relationship of the grid images;

a mirroring module for mirroring the first image to acquire the second image;

a synthesis module for synthesizing the first image and the second image to acquire a superimposed image of the first image and the second image.

According to the embodiment of the present disclosure, the grid template and the grid mapping table are used for performing mapping processing on the two-dimensional image to be processed so as to simulate the left-eye image and the right-eye image acquired by the human eyes; that is, according to the device, the mapping processing need be performed on the same two-dimensional image to be processed only once, the left-eye image and the right-eye image may be acquired, the steps of image processing are reduced, thus, the time of image processing is shortened, and conditions are provided for the follow-up real-time conversion of the superimposed two-dimensional image into the three-dimensional image.

According to the third aspect, the embodiment of the invention provides image processing means which comprises:

a memory and a processor, wherein the memory and the processor are in communication connection with each other; computer instructions are stored in the memory; and the processor, by executing the computer instructions, implements the image processing method according to the first aspect of the present disclosure or any one of the implementation manners of the first aspect.

According to the fourth aspect, the embodiment of the present disclosure provides a computer readable storage medium; and the computer instructions are stored in the computer readable storage medium, and are used for enabling a computer to implement the image processing method according to the first aspect of the present disclosure, or any one of the implementation manners of the first aspect.

According to the fifth aspect, the embodiment of the present disclosure provides a three-dimensional imaging system which comprises:

an image acquisition means, comprising a single lens as a lens for acquiring images, used for acquiring the two-dimensional image to be processed;

the image processing means in the third aspect of the present disclosure, electrically connected to the image acquisition means, and used for processing the two-dimensional image to be processed;

an image display means, electrically connected to the image processing means, and used for displaying a three-dimensional image.

In the three-dimensional imaging system provided by the embodiment of the present disclosure, the image acquisition means comprises a single lens, and does not require the use of two image acquisition systems like image acquisition means comprising dual lenses, and thus, the volume of the entire image acquisition means is reduced; and in addition, the outer diameter of a single-lens endoscope may be much smaller than that of a double-lens endoscope, so that the three-dimensional imaging system may be used in relatively small-sized human organs to perform the three-dimensional imaging on the human organs, and the application range of the three-dimensional imaging system is further expanded.

BRIEF DESCRIPTION OF THE DRAWINGS

The features and advantages of the present disclosure will be understood more clearly by referring to the drawings. The drawings are schematic and should not be construed as limiting the present disclosure. In the drawings.

DESCRIPTION OF THE EMBODIMENTS

For the purpose of making objects, technical schemes and advantages of the embodiments of the present disclosure more clear, clear and complete description will be made to the technical schemes of the embodiments of the present disclosure with reference to the accompany drawings in accordance with the embodiments of the present disclosure. Obviously, the described embodiments are merely a part or not all of the embodiments of the present invention. Based on the embodiments of the present disclosure, all other embodiments acquired by those skilled in the art without creative work fall within the protection scope of the present invention.

An image processing method provided by the present disclosure is used for simulating a left-eye image and a right-eye image observed by human eyes. Specifically, the mapping processing is performed on an acquired two-dimensional image to be processed so as to create binocular parallax images as the left-eye image and the right-eye image, and thus, the stereoscopic vision is realized. In addition, the left-eye image and the right-eye image are synthesized to acquire the superimposed image of the first image and the second image for establishing a convergence angle. Subsequently, a three-dimensional image may be formed through image display means of a three-dimensional imaging system in accordance with the present disclosure in combination with the binocular parallax images and the convergence angle.

Figure 1:
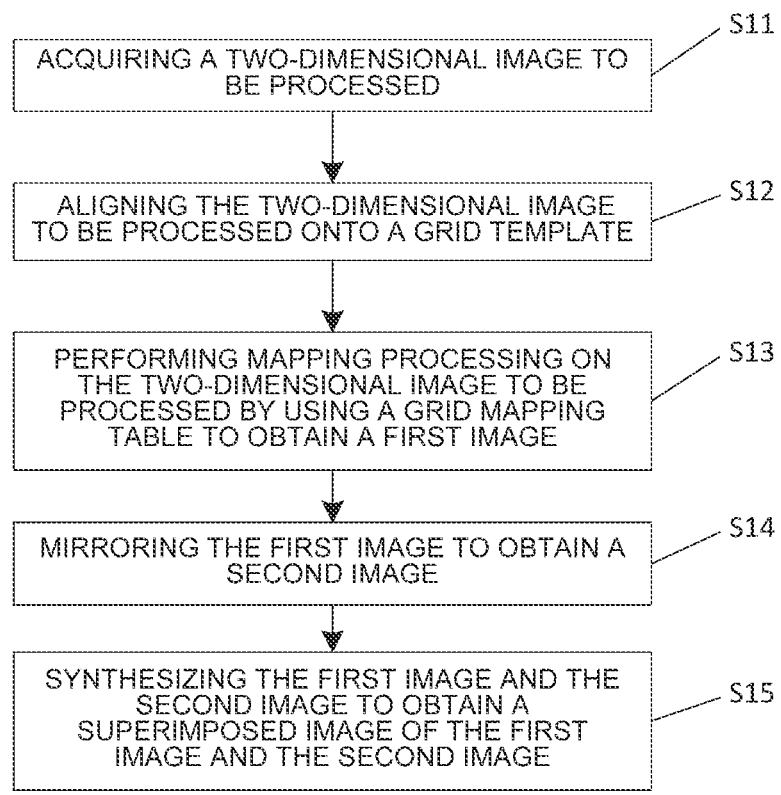
FIG. 1 is a specific schematic flowchart of an image processing method in accordance with an embodiment of the present disclosure.

The embodiment of the invention provides the image processing method; and as shown in FIG. 1, the method comprises the following steps of:

S11. acquiring a two-dimensional image to be processed.

the two-dimensional image to be processed acquired by an image processing device may be a two-dimensional picture, may also be one frame image in video streaming, and may also be each frame image extracted from a real-time acquired video, as long as it may be ensured that the image processing device may acquire the two-dimensional image to be processed.

S12. aligning the two-dimensional image to be processed onto a grid template.

Thereinto, the grid template is used for performing grid division on the two-dimensional image to be processed. Specially, the grid template is used for performing normalization processing on the two-dimensional image to be processed so that the two-dimensional image to be processed of any size may be scaled in equal proportions, so that the size of the scaled two-dimensional image to be processed is matched with the grid template.

S13. performing the mapping processing on the two-dimensional mage to be processed by using a grid mapping table to acquire a first image.

Thereinto, the grid mapping table is used for representing the mapping relationship of grid images. The grid mapping table may be indexed by grid numbers, or it may be specified in advance that the mapping relationship in the grid mapping table is stored from left to right and top to bottom according to the grid template (that is, the storage order of relevant information in the grid mapping table is specified in advance), or the grid mapping table may be indexed in other ways.

The image processing device uses the mapping relationship stored in the grid mapping table to perform mapping processing on the two-dimensional image to be processed. For example, the whole of two-dimensional image to be processed may be processed, or the two-dimensional image to be processed may also be divided, and the divided images are processed, and the like. That is, the image processing device performs mapping processing on the basis of the two-dimensional image to be processed to form the first image. Thereinto, the mapping relationship may be that the transformed image has a near end looking large and a far end looking small, or the perspective image may be figured out through formulas, and the like.

S14. mirroring the first image to acquire a second image.

Thereinto, the first image is a left-eye image, and the second image is a right-eye image; or the first image is a right-eye image, and the second image is a left-eye image.

The inventor of the present invention has acquired through many experiments that the left-eye image and the right-eye image observed by the human eyes are mirror images, that is, the second image may be acquired after the mirroring processing is performed on the first image acquired after mapping.

S15. synthesizing the first image and the second image to acquire the superimposed image of the first image and the second image.

The image processing device is used for synthesizing the first image and the second image to acquire the superimposed image of the first image and the second image. The synthesized first image and second image may be output to image display means for subsequent three-dimensional image display. Thereinto, subsequent image display means may enable the polarization directions of the two images to be perpendicular to each other by adjusting the polarization directions of the left-eye image and the right-eye image. When a user uses the image display means, the three-dimensional image may be viewed through wearing a pair of 3D glasses by the user. The adjustment of the polarization directions may also be realized by adopting other manners, as long as the polarization directions of the two images respectively seen by the two eyes of a person are ensured to be perpendicular to each other.

According to the embodiment of the present disclosure, the grid template and the grid mapping table are used for performing mapping processing on the two-dimensional image to be processed so as to simulate the left-eye image and the right-eye image acquired by the human eyes; that is, according to the method, the mapping processing need be performed on the same two-dimensional image to be processed only once, the left-eye image and the right-eye image may be acquired, and accordingly the steps of image processing are reduced, thus, the time of image processing is shortened, and conditions are provided for the follow-up real-time conversion of the superimposed two-dimensional image into the three-dimensional image.

Figures 2, 3:
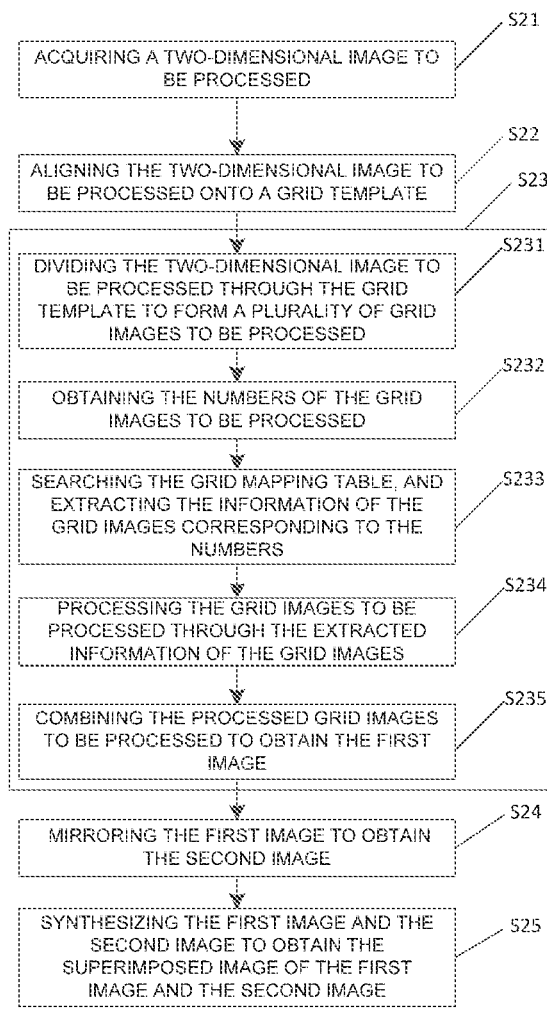
FIG. 2 is another specific schematic flowchart of the image processing method in accordance with the embodiment of the present disclosure.
FIG. 3 is a specific schematic diagram of grid template division in the embodiment of the present disclosure.

The embodiment of the present disclosure further provides an image processing method; and as shown in FIG. 2, the method comprises the following steps of:

S21. acquiring the two-dimensional image to be processed; and please refer to the S11 of the embodiment shown in FIG. 1 for details, which will not be repeated here.

S22. aligning the two-dimensional image to be processed onto the grid template.

Thereinto, the grid template is used for performing grid division on the two-dimensional image to be processed. The grid template may be divided into a plurality of grids each corresponding to a unique identification number as shown in FIG. 3. It should be noted that the numbers of grids formed by dividing the grid template may be specifically set depending on actual usage conditions, not limited to the numbers shown in FIG. 3. In addition, the coding method of the grids is not limited to this, and all coding methods that may distinguish all the grids from one another fall into the protection scope of the present disclosure.

S23. performing mapping processing on the two-dimensional image to be processed by using the grid mapping table to acquire the first image.

Thereinto, the grid mapping table is used for representing the mapping relationship of the grid images. According to the embodiment of the present disclosure, the grid mapping table comprises a number of each of grids in the grid template; and the information of the mapped grid images corresponding to the numbers is stored in the grid mapping table.

The grid mapping table may be expressed in the following form:

| Number | 0000 | 0001 | 0010 | ... | 1110 | 1111 |
|---|---|---|---|---|---|---|
| Information of grid images | Information 1 | Information 2 | Information 3 | ... | Information 15 | Information 16 |

Specially, the mapping processing comprises the following steps of:

S231. dividing the two-dimensional image to be processed through the grid template to form a plurality of grid images to be processed.

After he two-dimensional image to be processed are aligned onto the grid template by the image processing device, the two-dimensional image to be processed is divided through the manner of dividing grids in the grid template to form a plurality of grid images to be processed. Thereinto, the numbers of the divided grid images to be processed are the same as the numbers of the grids at the corresponding positions in the grid template, so that the numbers may be used to query the grid mapping table for acquiring the information of the grid images.

S232. acquiring the numbers of the grid images to be processed.

After the two-dimensional image to be processed are divided by the image processing device, the grid images to be processed are numbered with the respective numbers of the grids in the grid template. As described above, the numbers of the grid images to be processed are the same as the numbers of the grids at the corresponding positions in the grid template. Therefore, the image processing device only needs to extract the numbers of the grids at the corresponding positions, and does not need to perform secondary numbering on the grid images to be processed, and thus, the processing time is saved.

S233. searching the grid mapping table, and extracting the information of the grid images corresponding to the numbers.

The image processing device uses the numbers of the grid images to be processed to query the information of the grid images corresponding to the numbers from the grid mapping table. Thereinto, the information of the grid images may be the sizes of the mapped grid images, or coordinate data of each endpoint of the mapped grid images in the grid mapping table and the like.

Optionally, according to the embodiment, the size information of the mapped grid images is stored in the grid mapping table.

Figure 4:
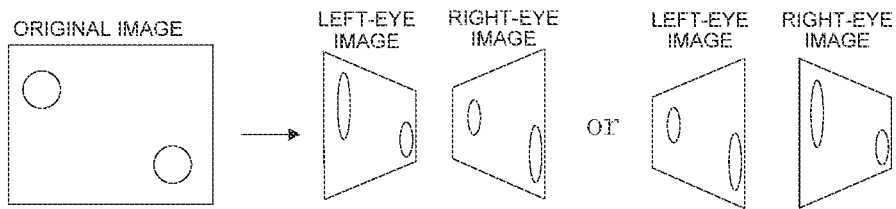
FIG. 4 is a schematic diagram illustrating a principle of mapping transformation in the embodiment of the present disclosure.

S234. processing the grid images to be processed by using the extracted information of the grid images;

The image processing device uses the extracted size information of the grid images to process the grid images to be processed, Thereinto, the principle of the mapping transformation is illustrated in FIG. 4. The mapping transformation means that by taking the left side of an original image as a rotation axis, the original image is turned, inwards a screen, by a certain angle, and is rotated, outwards the screen, by the same angle, so as to respectively form middle and rightmost images in FIG. 4. According to the embodiment, the size of the two-dimensional image to be processed is linearly scaled, so that the scaled first image and second image achieve the effect shown in FIG. 4. That is, the image processing device performs scaling processing on the grid images to be processed according to the sizes of the extracted grid images; and the scaling processing method specifically may comprise the following steps of:

1), scanning the grid images to be processed line by line.

The image processing device scans the grid images to be processed line by line to acquire the sizes of each line of the grid images to be processed.

2). sequentially performing linear scaling on each line of images.

The image processing device performs linear scaling on the sizes of each line of the grid images to be processed according to the principle that one end looks large and the other end looks small, and thus, the scaled first image is acquired. By sequentially linearly scaling each line of grid images. the amount of processed data is reduced, and the efficiency of image processing may be achieved.

S235. combining the processed grid images to be processed to acquire the first image.

The image processing device uses the numbers of the grid images to be processed to recombine the images subjected to mapping processing so as to acquire the first image.

S24. mirroring the first image to acquire the second image.

Thereinto, the first image is the left-eye image, and the second image is the right-eye image; or the first image is the right-eye image, and the second image is the left-eye image. Please refer to the S14 of the embodiment shown in FIG. 1, which will not be repeated here.

S25. synthesizing the first image and the second image to acquire the superimposed image of the first image and the second image. Please refer to the S15 of the embodiment shown in FIG. 1, which will not be repeated here.

Compared with the embodiment shown in FIG. 1, the embodiment uses the sizes of the mapped grid images stored in the grid mapping table to perform scaling processing on each grid image to be processed, that is, the grid images to be processed are processed from the perspective of the image sizes without involving the resolution and pixels of the images and other information. On the one hand, the image quality may be ensured; and on the other hand, the processing efficiency may be improved.

Figure 5:
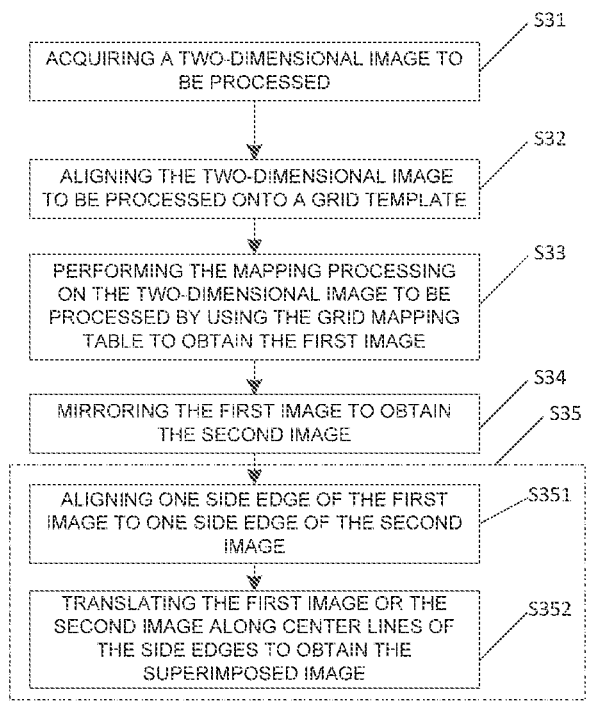
FIG. 5 is another specific schematic flowchart of the image processing method in accordance with the embodiment of the present disclosure.

The embodiment of the present disclosure further provides an image processing method; and as shown in FIG. 5, the method comprises the following steps of:

S31. acquiring the two-dimensional image to be processed; and please refer to the Sal of the embodiment shown in FIG. 2 for details, which will not be repeated here;

S32. aligning the two-dimensional image to be processed onto the grid template.

Thereinto, the grid template is used for performing grid division on the two-dimensional image to be processed. Please refer to the S22 of the embodiment shown in FIG. 2 for details, which will not be repeated here.

S33. performing mapping processing on the two-dimensional image to be processed by using the grid mapping table to acquire the first image.

Thereinto, the grid mapping table is used for representing the mapping relationship of the grid images. Please refer to the S23 of the embodiment shown in FIG. 2 for details, which will not be repeated here.

S34. mirroring the first image to acquire the second image, wherein the first image is the left-eye image, and the second image is the right-eye image; or the first image is the right-eye image, and the second image is the left-eye image. Please refer to the S24 of the embodiment shown in FIG. 2, which will not be repeated here.

S35. synthesizing the first image and the second image to acquire the superimposed image of the first image and the second image.

Figure 6:
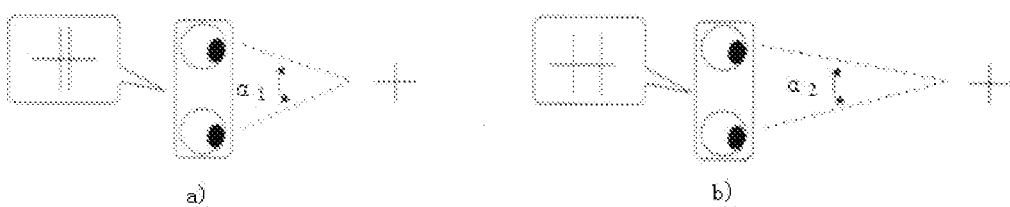
FIG. 6 is a schematic diagram of a relationship between a convergence angle and the distance between a left-eye image and a right-eye image in the embodiment of the present disclosure.

The image processing device adjusts the distance between the left-eye image and the right-eye image formed after mapping processing for creating the convergence angle. The inventor of the present application has acquired through many experiments that when the distance between the images changes, the corresponding convergence angle changes. For example, as shown in FIG. 6, the relationship between the convergence angle and the distance between the left-eye image and the right-eye image is illustrated. As shown in FIG. 6a), when the convergence angle is $\alpha_1$, the distance between the left eye and the right eye is relatively small. As shown in FIG. 6b), when the convergence angle is $\alpha_2$, the distance between the left eye and the right eye is relatively large; and that is, as the distance between the left eye and the right eye changes, the convergence angle will also change accordingly. Therefore, according to the present disclosure, the convergence angle is created by adjusting the distance between the left-eye image and the right-eye image. That is, the distance between the left-eye image and the right-eye image is adjusted so as to superimpose the two images.

The synthesizing specifically comprises the following steps of:

S351. aligning one side edge of the first image to one side edge of the second image.

Thereinto, the central point of the side edge of the first image coincides with the central point of the side edge of the second image.

The image processing device aligns the first image and the second image along the side edges thereof, and the central points of the aligned side edges coincide, corresponding to the first image and the second image, respectively.

S352. translating the first image or the second image along the center lines of the side edges to acquire the superimposed image.

The image processing device translates the first image or the second image along the center lines of the aligned side edges of the first image and the second image. One of the first image and the second image may be translated; or both of the first image and the second image respectively move in opposite directions to form the superimposed image of the first image and the second image.

Compared with the image processing method provided by the embodiment shown in FIG. 2, the embodiment has the advantage that there is a certain distance between the left-eye image and the right-eye image by translating the first image or the second image to create the convergence angle. Subsequently, the three-dimensional image may be formed through the image display means of the three-dimensional imaging system in combination with the binocular parallax images and the convergence angle.

Figure 7:
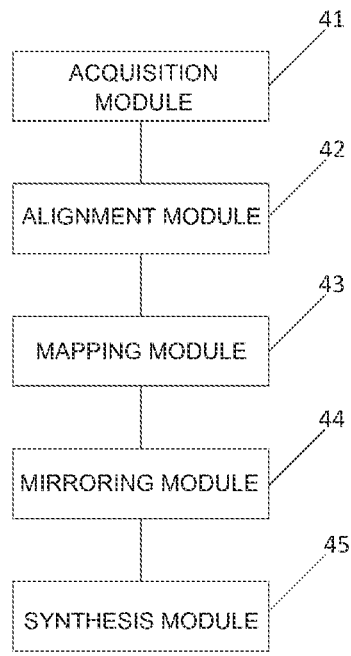
FIG. 7 is a specific schematic structural diagram of an image processing device in accordance with the embodiment of the present disclosure.

An embodiment of the present disclosure also provides the image processing device; and as shown in FIG. 7, the device comprises:

an acquisition module 41 for acquiring the two-dimensional image to be processed;

an alignment module 42 for aligning the two-dimensional image to be processed onto the grid template, wherein the grid template is used for performing grid division on the two-dimensional image to be processed;

a mapping module 43 for performing mapping processing on the two-dimensional image to be processed by using the grid mapping table to acquire the first image, wherein the grid mapping table is used for representing the mapping relationship of the grid images;

a mirroring module 44 for mirroring the first image to acquire the second image;

a synthesis module 45 for synthesizing the first image and the second image to acquire the superimposed image of the first image and the second image.

According to the image processing device provided by the embodiment of the present disclosure, the grid template and the grid mapping table are used for performing mapping processing on the two-dimensional image to be processed so as to simulate the left-eye image and the right-eye image acquired by the human eyes; that is, according to the method of the present disclosure, the mapping processing need be performed on the same two-dimensional image to be processed only once, the left-eye image and the right-eye image may be acquired, the steps of image processing being reduced, thus, the time of image processing being shortened, and conditions are provided for the follow-up real-time conversion of the superimposed two-dimensional image into the three-dimensional image.

Figure 8:
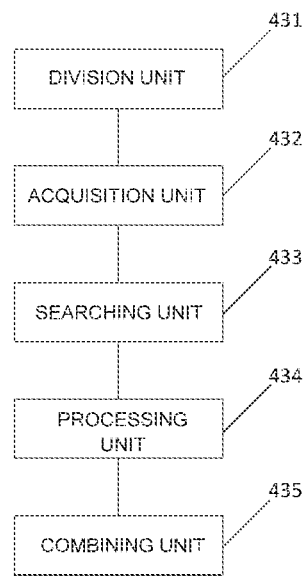
FIG. 8 is another specific schematic structural diagram of the image processing device in accordance with the embodiment of the present disclosure.

In some optional implementation manners of the embodiment, as shown in FIG. 8, the mapping module 43 comprises:

a division unit 431 for dividing the two-dimensional image to be processed through the grid template to form a plurality of grid images to be processed;

an acquisition unit 432 for acquiring the numbers of the grid images to be processed;

a searching unit 433 for searching the grid mapping table and extracting the information of the grid images corresponding to the numbers;

a processing unit 434 for processing the grid images to be processed by using the extracted information of the grid images;

a combining unit 435 for combining the processed grid images to be processed to acquire the first image.

Figure 9:
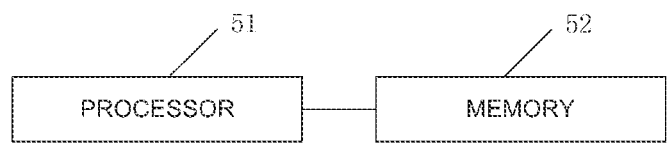
FIG. 9 is a specific schematic structural diagram of image processing means in accordance with the embodiment of the present disclosure.

An embodiment of the present disclosure also provides image processing means. As shown in FIG. 9, the image processing means may comprise a processor 51 and a memory 52, wherein the processor 51 and the memory 52 may be connected by a bus or other manners. The bus connection is taken as an example in FIG. 9.

The processor 51 may be a central processing unit (CPU). The processor 51 may also be other general-purpose processors, digital signal processors (DSP), application specific integrated circuits (ASIC), field-programmable gate arrays (FPGA), or other programmable logic devices, discrete gates or transistor logic devices, chips such as discrete hardware components, or a combination of the above types of chips.

As a non-transitory computer readable storage medium, the memory 52 may be used for storing non-transitory software programs, non-transitory computer executable programs and modules such as program instructions/modules corresponding to the image processing method provided by the embodiment of the present disclosure (for example, the acquisition module 41, the alignment module 42, the mapping module 43, the mirroring module 44, and the synthesis module 45 shown in FIG. 7). The processor 51 executes various functional applications and data processing by running non-transitory software programs, instructions, and modules stored in the memory 52, that is, the image processing method in the above method embodiment is realized.

The memory 52 may comprise a program storage area and a data storage area. The program storage area may store an operating system and an application program required by at least one function; and the data storage area may store data created by the processor 51 and the like. In addition, the memory 52 may comprise a high-speed random access memory, and may also comprise non-transitory memories, such as at least one magnetic disk storage device, a flash memory device, or other non-transitory solid-state storage devices. In some embodiments, the memory 52 may optionally comprise memories remotely set with respect to the processor 51; and the remote memories may be connected to the processor 51 through networks. Examples of the above networks include, but are not limited to, Internet, intranets, local area networks, mobile communication networks, and combinations thereof.

The one or more modules are stored in the memory 52, and when the modules are executed by the processor 51, the image processing methods provided by the embodiments shown in FIG. 1, FIG. 2 and FIG. 5 are executed.

The specific details of the above image processing means may be understood with reference to the corresponding related description and effects in the embodiments shown in FIG. 1, FIG. 2 and FIG. 5, and will not be repeated here.

Figure 10:
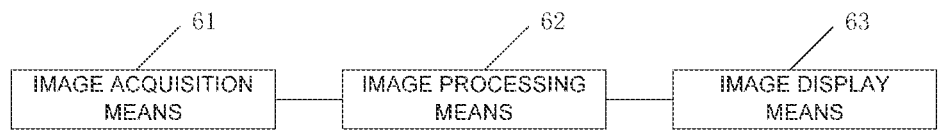
FIG. 10 is a specific schematic structural diagram of a three-dimensional imaging system in accordance with the embodiment of the present disclosure.

The embodiment of the present disclosure also provides a three-dimensional imaging system. As shown in FIG. 10, the system comprises the image acquisition means 61, the image processing means 62, and the image display means 63.

Thereinto, in the image acquisition means 61, a lens for acquiring images is a single lens, and is used for acquiring the two-dimensional image to be processed. The image processing means 62 is electrically connected to the image acquisition means 61, and is used for processing the two-dimensional image to be processed output by the image acquisition means 61. The image display means 63 is electrically connected to the image processing means 62 and is used for displaying the image output by the image processing means 62.

In the three-dimensional imaging system provided by the embodiment of the present disclosure, the lens in the image acquisition means 61 is a single lens, so that the volume of the entire image acquisition means 61 is reduced; and in addition, the image acquisition means with the single lens needs only one data line to transmit the acquired image, so that the inner diameter of a connecting line between the image acquisition means 61 and the image processing means 62 may be reduced, and the three-dimensional imaging system may be used in relatively small-sized objects such as human organs to perform the three-dimensional imaging on the human organs; and the application range of the three-dimensional imaging system is further expanded.

Those skilled in the art may understand that all or part of the processes in the methods provided by the above embodiments may be implemented by instructing relevant hardware through computer programs. The programs may be stored in a computer readable storage medium. When the programs are executed, the processes of embodiments as the above methods may be included. Thereinto, the storage medium may be a magnetic disk, an optical disk, a read-only memory (ROM), a random-access memory (RAM), a flash memory, a hard disk drive (abbreviation: HDD) or a solid-state drive (SSD), etc.; and the storage medium may also include a combination of the above types of memories.

Although the embodiments of the present disclosure have been described in conjunction with the drawings, various modifications and variations may be made by those skilled in the art without departing from the spirit and scope of the present disclosure, and such modifications and variations fall within the scope defined by the attached claims.

What is claimed is:

1. An image processing method, comprising the following steps of:
   acquiring a two-dimensional image to be processed;
   aligning the two-dimensional image to be processed onto a grid template, wherein the grid template is used for performing grid division on the two-dimensional image to be processed;
   performing mapping processing on the two-dimensional image to be processed by using a grid mapping table to acquire a first image, wherein the grid mapping table is used for representing a mapping relationship of grid images;
   mirroring the first image to acquire a second image, wherein the first image is a left-eye image, and the second image is a right-eye image; or the first image is a right-eye image, and the second image is a left-eye image; and
   synthesizing the first image and the second image to acquire a superimposed image of the first image and the second image,
   wherein the grid mapping table comprises numbers of each of grids in the grid template; and information of the mapped grid images is stored in the grid mapping table corresponding to the numbers,
   wherein the performing mapping processing on the two-dimensional image to be processed by using the grid mapping table to acquire the first image comprises:
   dividing the two-dimensional image to be processed through the grid template to form a plurality of the grid images to be processed;
   acquiring the numbers of the grid images to be processed;
   searching the grid mapping table, and extracting the information of the grid images corresponding to the numbers;
   processing the grid images to be processed by using the extracted information of the grid images; and
   combining the processed grid images to be processed to acquire the first image,
   wherein the information of the grid images includes sizes of the grid images;
   the processing the grid images to be processed by using the extracted information of the grid images comprises the step of:
   scaling the grid images to be processed according to the extracted sizes of the grid images.

2. The method of claim 1, wherein the synthesizing the first image and the second image to acquire the superimposed image of the first image and the second image comprises the following steps of:

aligning one side edge of the first image to one side edge of the second image, wherein a central point of the side edge of the first image coincides with a central point of the side edge of the second image; and translating the first image or the second image along a center line of the side edges to acquire the superimposed image.

3. The method of claim 1, wherein the two-dimensional image to be processed is one frame image in video streaming.

4. An image processing device, comprising:

an acquisition module for acquiring a two-dimensional image to be processed;

an alignment module for aligning the two-dimensional image to be processed onto the grid template, wherein the grid template is used for performing grid division on the two-dimensional image to be processed;

a mapping module for performing mapping processing on the two-dimensional image to be processed by using the grid mapping table to acquire the first image, wherein the grid mapping table is used for representing a mapping relationship of the grid images;

a mirroring module for mirroring the first image to acquire the second image, wherein the first image is a left-eye image, and the second image is a right-eye image; or the first image is a right-eye image, and the second image is a left-eye image; and a synthesis module for synthesizing the first image and the second image to acquire a superimposed image of the first image and the second image, wherein the grid mapping table comprises numbers of each of grids in the grid template; and information of the mapped grid images is stored in the grid mapping table corresponding to the numbers, wherein the mapping module divides the two-dimensional image to be processed through the grid template to form a plurality of the grid images to be processed, acquires the numbers of the grid images to be processed, searches the grid mapping table, and extracting the information of the grid images corresponding to the numbers, processes the grid images to be processed by using the extracted information of the grid images, and combines the processed grid images to be processed to acquire the first image, wherein the information of the grid images includes sizes of the grid images;

the mapping module further scales the grid images to be processed according to the extracted sizes of the grid images.

5. An image processing means, comprising:

a memory and a processor which are in communication connection with each other, wherein computer instructions are stored in the memory, and the processor is used for executing the computer instructions, to implement the image processing method of claim 1.

6. A non-transitory computer readable storage medium, wherein the computer instructions are stored in the computer readable storage medium, and are used for enabling a computer to implement the image processing method of claim 1.

7. A three-dimensional imaging system, comprising:

an image acquisition means, comprising a single lens as a lens for acquiring images, used for acquiring a two-dimensional image to be processed;

the image processing means of claim 5, electrically connected to the image acquisition means, and used for processing the two-dimensional image to be processed; and an image display means, electrically connected to the image processing means, and used for displaying a three-dimensional image.

\* \* \* \* \*